United States Patent
Scroggins

(10) Patent No.: US 9,425,660 B2
(45) Date of Patent: Aug. 23, 2016

(54) ORBITAL MOTOR AND GENERATOR

(71) Applicant: C. Michael Scroggins, Richmond, TX (US)

(72) Inventor: C. Michael Scroggins, Richmond, TX (US)

(*) Notice: Subject to any disclaimer, the term of this patent is extended or adjusted under 35 U.S.C. 154(b) by 415 days.

(21) Appl. No.: 13/871,988

(22) Filed: Apr. 26, 2013

(65) Prior Publication Data

US 2014/0319940 A1    Oct. 30, 2014

(51) Int. Cl.

| | |
|---|---|
| *H02K 1/30* | (2006.01) |
| *H02K 1/32* | (2006.01) |
| *H02K 3/47* | (2006.01) |
| *H02K 19/22* | (2006.01) |
| *H02K 1/22* | (2006.01) |
| *H02K 5/04* | (2006.01) |
| *H02K 5/20* | (2006.01) |
| *H02K 7/02* | (2006.01) |
| *H02K 9/08* | (2006.01) |
| *H02K 19/10* | (2006.01) |
| *H02K 7/08* | (2006.01) |

(52) U.S. Cl.
CPC .. *H02K 1/30* (2013.01); *H02K 1/22* (2013.01); *H02K 3/47* (2013.01); *H02K 5/04* (2013.01); *H02K 5/20* (2013.01); *H02K 7/02* (2013.01); *H02K 9/08* (2013.01); *H02K 19/10* (2013.01); *H02K 19/22* (2013.01); *H02K 7/083* (2013.01); *Y02E 60/16* (2013.01)

(58) Field of Classification Search
CPC ....... H02K 1/30; H02K 1/2793; H02K 1/182; H02K 16/00–16/04; H02K 3/47; H02K 1/26; H02K 1/32

USPC ........... 310/156.32, 112, 114, 266, 268, 164, 310/216.023, 60 A, 40 MM
IPC ....................................................... H02K 1/26
See application file for complete search history.

(56) References Cited

U.S. PATENT DOCUMENTS

| | | | | |
|---|---|---|---|---|
| 1,897,184 | A * | 2/1933 | Zopp | 310/166 |
| 3,025,708 | A | 3/1962 | Slater et al. | |
| 3,242,745 | A | 3/1966 | Romberg | |
| 3,603,161 | A | 9/1971 | Schwarz | |
| 3,961,211 | A | 6/1976 | Vergues | |
| 4,500,265 | A * | 2/1985 | Evans et al. | 417/417 |
| 4,608,505 | A * | 8/1986 | Schumacher | 310/267 |
| 5,798,591 | A * | 8/1998 | Lillington | H02K 3/04 310/164 |
| 5,982,069 | A * | 11/1999 | Rao | H02K 3/26 310/201 |
| 7,538,446 | B2 * | 5/2009 | Bonnet | 290/55 |
| 7,750,515 | B1 * | 7/2010 | Gabrys | 310/61 |
| 2008/0036330 | A1 * | 2/2008 | Abe | H02K 16/00 310/268 |

OTHER PUBLICATIONS

"envelop." American Heritage® Dictionary of the English Language, Fifth Edition. 2011. Houghton Mifflin Harcourt Publishing Company Jan. 12, 2016 http://www.thefreedictionary.com/envelop.*
"electromagnet." American Heritage® Dictionary of the English Language, Fifth Edition. 2011. Houghton Mifflin Harcourt Publishing Company Jan. 12, 2016 http://www.thefreedictionary.com/electromagnet.*

* cited by examiner

*Primary Examiner* — Thomas Truong
(74) *Attorney, Agent, or Firm* — Forefront IP Lawgroup PLLC

(57) ABSTRACT

Described herein is a technology for an electric motor system that reduces stress in motor shaft bearings. Furthermore, the electric motor system that provides an adequate heat ventilation is described herein.

20 Claims, 5 Drawing Sheets

Background

ORBITAL MOTOR AND GENERATOR

BACKGROUND

An electric motor is an electric machine that converts electrical energy into a mechanical energy. The electric motor typically operates through an interaction between an electric motor's magnetic fields and winding currents to generate force within the motor. This force provides a torque that may further be the source of the mechanical energy in the electric motor.

The electric motor can also perform the reverse and act as generators, to produce electrical energy from mechanical energy. For example, in electrical generators such as an alternator or a dynamo, the mechanical energy is transformed into electrical energy. In this example, the electric motor finds applications as diverse as industrial fans, blowers and pumps, machine tools, household appliances, power tools, and disk drives.

Furthermore, the electric motors can be powered by direct current sources, such as from batteries, motor vehicles or rectifiers, or by alternating current sources, such as from the power grid, inverters or generators. The largest of electric motors are used for ship propulsion, pipeline compression and pumped-storage applications with ratings of several megawatts.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
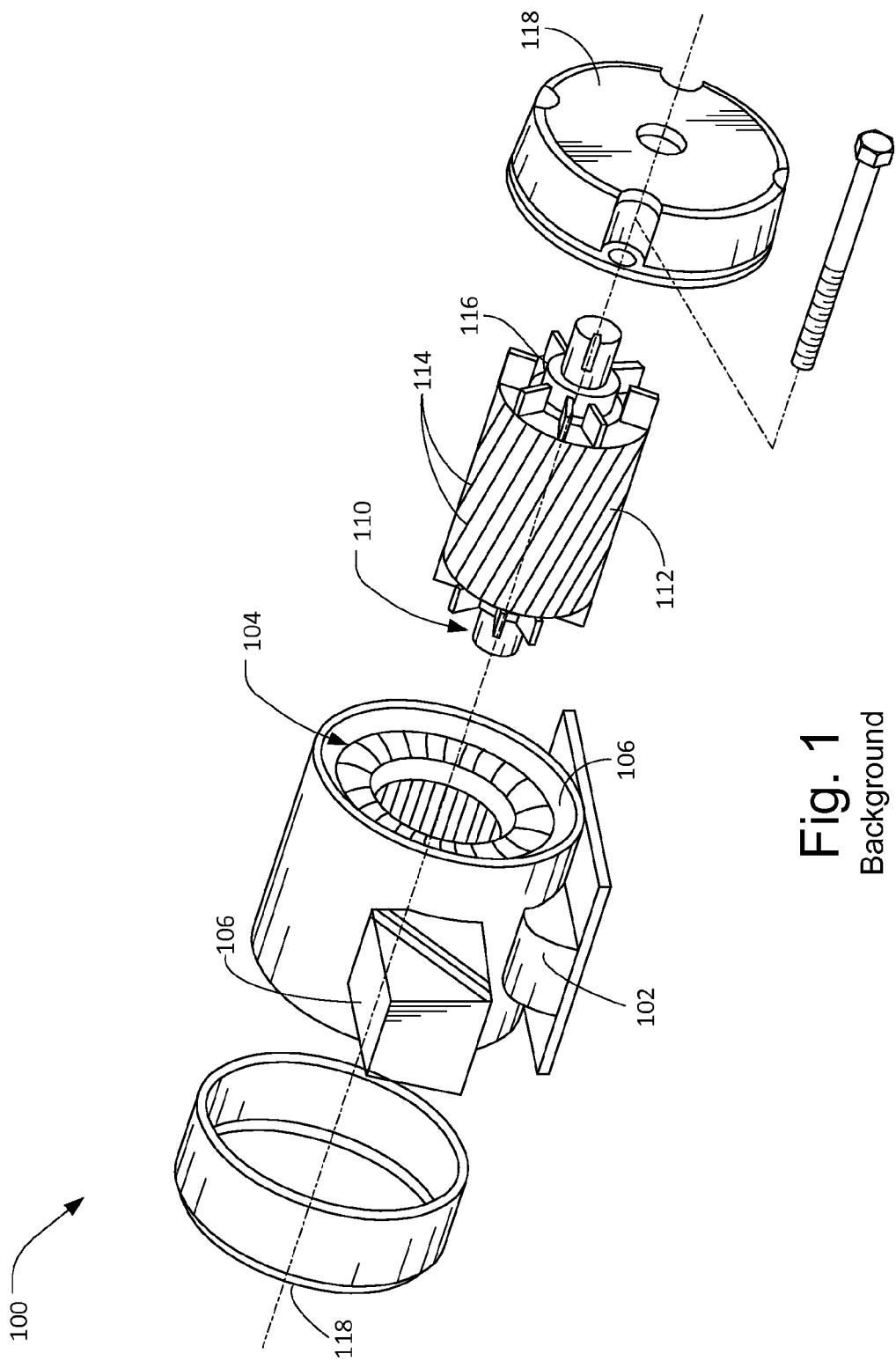
FIG. 1 illustrates a conventional electric motor system.

Described herein is a technology for an electric motor system that reduces stress in motor shaft bearings; thus reducing wear and increasing life of such bearing. Furthermore, the technology described herein provides adequate heat dissipation/ventilation to improve the performance and life of an electric motor system.

As an example implementation herein, the electric motor system includes a motor shaft that is coupled by the motor shaft bearings to a motor frame, a motor-shaft arm that extends perpendicularly from the motor shaft, and rotor windings that are associated with an end (or tip) of the motor-shaft arm. In this configuration, the rotor windings orbit an axis of the motor shaft with the length of the motor-shaft arm as its radius.

Furthermore, the electric motor system includes a stator housing with a C-shaped stator windings that envelop a circumferential path surface of the orbiting rotor windings. For example, the circumferential path surface includes outer surface of a ring that is defined by a circular path of the orbiting rotor windings. In this example, the radius would be the length of the motor-shaft arms plus the size of the rotor windings.

To reduce the stress in the motor shaft bearings, a gyroscopic principle is adapted on a structure that includes the motor shaft, the motor-shaft arm, and the orbiting rotor windings. For example, when the motor shaft spins, an angular momentum that is created by the orbiting rotor windings may relieve the motor shaft bearings of stress due to gravitational weight of the motor shaft and the motor-shaft arm. In this example, the motor shaft bearings will experience less amount of weight that it will receive from the motor shaft.

With this gyroscopic structure, the electric motor system is also provided with adequate heat ventilation. For example, when the motor-shaft arms spins during operation, the generated heat in the stator and rotor windings are channeled through an air gap on top or below the motor-shaft arms. The air gap is a space in between the motor-shaft arms and the motor frame. Furthermore, this air gap may be utilized for installation of an internal cooling system. For example, the internal cooling system utilizes refrigerants, chilled water, etc. to cool the channeled heat from the stator and rotor windings. In other words, in addition to external cooling system (e.g., heat sink), the internal cooling system allows heat displacement within the electric motor system.

As an example implementation herein, the electric motor system further derives additional heat ventilation through the air gap in between the motor frame and the stator housing. For example, the heat that is generated by the stator and rotor windings may be channeled further through this air gap at back surface of the stator housing. In this example, the motor-shaft arms act as a vane to further enhance the airflow within the motor frame. This way, the external cooling system will be more efficient since it will react in an even distribution of heat relief.

Example Conventional Electric Motor

FIG. 1 illustrates a conventional electric motor system 100. The electric motor system 100 typically includes a motor frame 102, a stator housing 104 with associated stator windings 106, a wiring cover 108, a motor shaft 110 with associated rotor windings 112, fan blades 114, bearings 116 and end bells 118.

In the conventional electric motor 100, a common source of breakdown is due to over heating in its stator and rotor windings. For example, the over heating may be due to wear and tear in the bearings 116 or it may be due to over loading. In this example, the over heating is further intensified by insufficient heat ventilation in the structure of the electric motor system 100.

A basic operation of the electric motor 100 involves the stator windings 110 being energized by a current (not shown) flowing through its coil windings. Due to this inrush of energizing current, the stator windings 110 establish a magnetic field. Since the stator housing 104 is typically constructed throughout an inner diameter of the motor frame 102, the associated stator windings 106 will necessarily establish revolving magnetic fields as well.

Following magnetism principle, the revolving magnetic fields will induce currents to the rotor windings 112. These induced currents will similarly generate magnetic fields, albeit of opposite polarity. Since opposite polarities are attracted to each other, the revolving magnetic fields that are generated by the stator windings 104 may produce a torque on a structure of the rotor windings 112. This torque pulls and pushes the structure of the rotor windings 110 and thereby facilitates the turning of the motor shaft 110.

When the motor shaft 110 increases in speed, the inrush of energizing current and the induced currents are dramatically reduced as well. However, at any instant that the speed of the motor shaft 110 is reduced from its proper speed, for example, due to presence of over loading or seizure in the bearings 116, then the rotor and stator windings will again experience an increase in current flow and generated magnetic fields. A continuous exposure to this state will generate heat that may damage the insulation of the stator and rotor windings. In other words, without proper heat ventilation structure to take out the heat, the stator and rotor windings will easily get damaged. The torque shift in the rotor will create areas of gap tolerance changes at the top and bottom of the rotor and stator windings and this may cause arcing and lamination breakdown in the electric motor system.

Bearing Stress

With continuing reference to FIG. 1, the torque creates a stress on the bearings 116, which couple the motor shaft 110 to the end bells 118. This stress includes an amount of force that is exerted on the bearings 116. For example, the amount of force is in upward, downward or sideway directions. In other words, the life of the bearings 116 may be shortened by this stress. As a result, the life of the electric motor 100 may be reduced as well since any misalignment between the stator and rotor windings or any seizure or friction in the bearings 116 will over heat the electric motor 100 as discussed above.

The stress in the bearings 116 may be present due to the torque during startup, regular speed, or stop phases of the motor shaft 110. For example, an angular momentum of the spinning rotor windings 112 will generate the stress towards axial direction of the motor shaft 110. In this example, the bearings 116 will ultimately carry this stress that is received by the motor shaft 110. In another example, the bearings 116 will ultimately carry the stress that is created by the weight of the motor shaft 100 and its associated rotor windings 112 when the electric motor 100 is at rest.

Heat Ventilation

Another deficiency of the conventional electric motor 100 is inability of the fan blades 114 and the end bells 118 to dissipate heat. For example, during normal operation, the stator windings 106 and the rotor windings 112 generate extreme heat. In this example, the fan blades 114 are positioned to vent the generated extreme heat through an air gap in between surfaces of the rotor windings 112 and the stator windings 106. In other words, the air gap is limited by the distance of the surface of the rotor windings 112 to the exposed surface of the stator windings 106.

Since there is a trade in between this distance and a power factor (i.e., power efficiency) of the electric motor system 100, the air gap cannot be widened without decreasing the power efficiency. For example, the air gap may be narrowed and the power factor is increased; however, this narrow air gap generates more heat due to a lesser clearance for the fan blades 114 to dissipate the heat. On the other hand, the air gap may be widened and the power factor is decreased; however, a lesser power factor means a lesser torque created in the motor shaft 110 by the revolving magnetic fields. To this end, a higher energy (i.e., horsepower) is required to maintain proper speed (or synchronized frequency).

Cross-Sectional View of Example Electric Motor System

Figure 2:
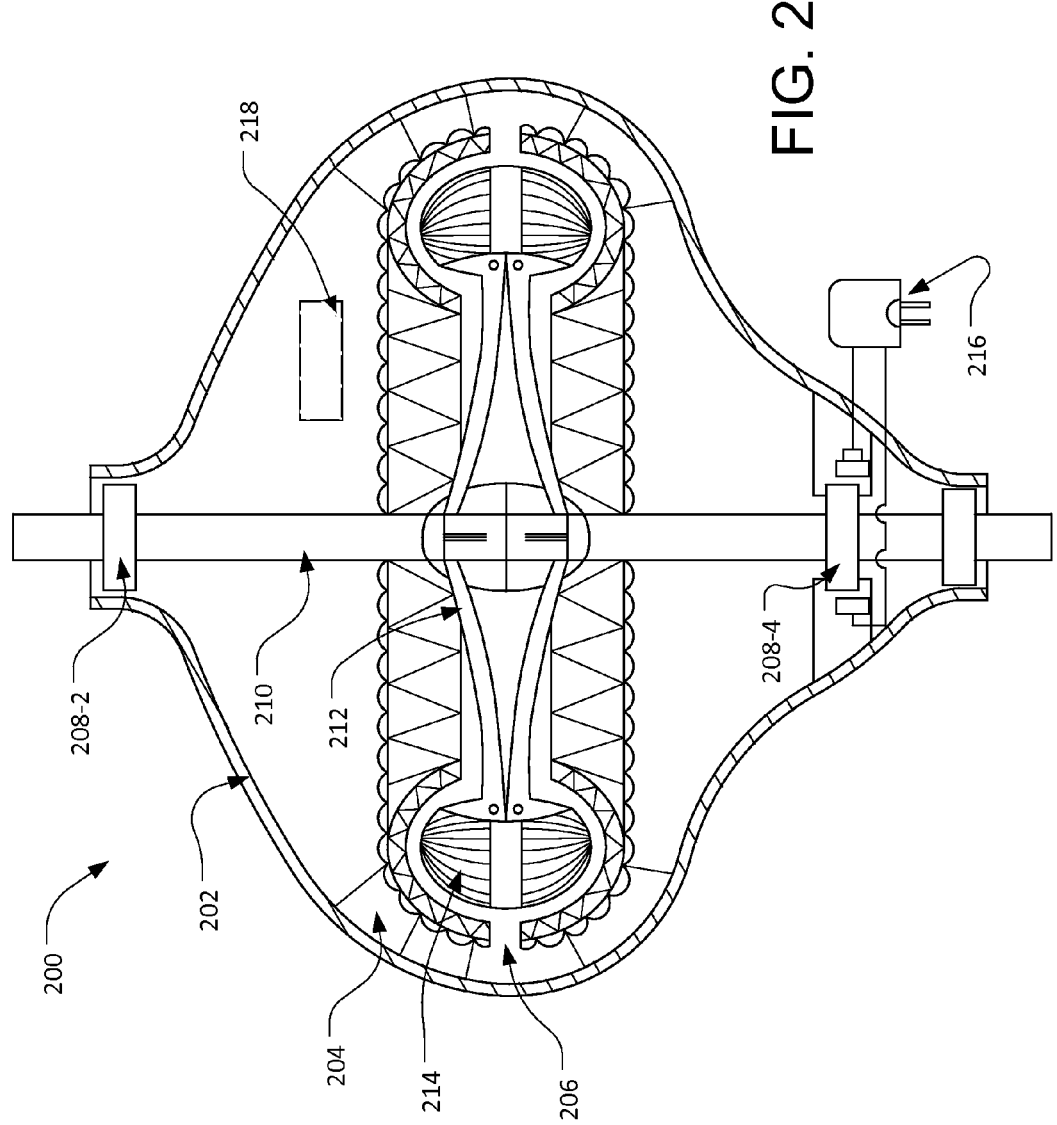
FIG. 2 illustrates an example cross-sectional view of an electric motor system in accordance with one or more implementations described herein.

FIG. 2 is an example cross-sectional view 200 of the electric motor system in accordance with one or more implementations of the technology described herein. The cross-sectional view 200 shows a spherical motor frame 202, a stator housing 204 with associated stator windings 206, bearings 208, a motor shaft 210, a motor-shaft arm 212 with associated rotor windings 214, a power supply 216, and a cooling mechanism 218.

As an example of present implementations herein, the motor frame 202 is built to protect electric motor components that are positioned within the motor frame 202. For example, the motor frame 202 is made of composite materials to shield the stator and rotor windings from hot, wet, corrosive, and other weathering conditions.

As shown, the motor frame 202 is associated to the stator housing 204 in such a way that an air gap (i.e., physical space) is allocated in between the two. For example, the stator housing 204 is manufactured to include multiple supporting flanges that attaches the stator housing 204 to the motor frame 202. In this example, the spacing in between the multiple supporting flanges, and the air gap (i.e., distance) that the supporting flanges create between the motor frame 202 and the stator housing 204 will provide a heat ventilation at the rear area of the stator windings 206. The heat ventilation, for example, may be implemented by inserting internal cooling system lines in the air gap. The internal cooling system lines are components of the cooling mechanism 218.

As an example of present implementations herein, the stator windings 206 are wound to form a circular C-shaped winding. In this example, the C-shaped winding includes an upper hemispherical winding (i.e., upper arc) and a lower hemispherical winding (i.e., lower arc) to envelope the rotor windings 214. The upper and lower hemispherical windings, for example, may be wound linearly and a middle section in between these hemispherical windings may allow the generated heat to pass through. For example, the generated heat in the stator and rotor windings will pass through the air gap in between the motor frame 202 and the stator housing 204.

As opposed to the positioning of the stator and rotor windings in FIG. 1, the air gap in between the stator windings 206 and the rotor windings 214 in accordance with one or more implementations of the technology described herein are not affected by the trade in between the size of the air gap and the power factor. In other words, the air gap in between the stator windings 206 and the rotor windings 214 may be designed to obtain maximum power efficiency and without regard to the generated heat at this maximum power efficiency.

As an example of present implementation herein, the bearings 208 couple the motor shaft 210 to the motor frame 202. In this example, the motor shaft 210 is positioned vertically in the motor frame 202 such that a top end and a bottom end of the motor shaft 210 is held by an upper bearing 208-2 and a lower bearings 208-4, respectively.

To relieve the bearings 208 of the stress, the structure that includes the motor shaft 210, the motor-shaft arm 212 and the associated rotor windings 214 are constructed based on gyroscopic flywheel principle. That is, the angular momentum in the motor shaft 210 is dramatically reduced when the structure is in operation. For example, due to spinning of the motor-shaft arm 212 and the associated rotor windings 214, the exerted torques and gravitational effect of the weight of the structure are stabilized. This gyroscopic flywheel principle is well known and may be adapted in accordance with one or more implementations of the technology described herein With continuing reference to FIG. 2, the motor-shaft arm 212 is configured to extend perpendicularly for example, from a center (e.g., midpoint) of the motor shaft 210. For example, the motor-shaft arm 212 is an elongated bar that couples the rotor windings 214 to the center of the motor shaft 210. In this example, the rotor windings 214 is collinear with the connecting center of the motor shaft 210. When the motor shaft 210 spins, the rotor windings 214 orbits the center or midpoint of the motor-shaft arm 212 with the motor-shaft arm length as its radius. Furthermore, the motor-shaft arm 212 may be configured to act as a vane to circulate airflow within the motor frame 202. For example, when the motor-shaft arm 212 spins during operation, the vane configuration circulates and channels the airflow to the location of the cooling mechanism 218.

As an example of present implementation herein, the rotor windings 214 include a north side and a south side windings. In between these two windings is a section that is exposed (i.e., lies in the same plane) to the section that is in between the upper and lower hemispherical windings of the stator windings 206. These sections in the stator and rotor windings may provide a path for channeling of the generated heat through the air gap on top or below the motor-shaft arm 212.

As an example of present implementation herein, the air gap on top or below the motor-shaft arm 212 creates more room for the heat ventilation of the electric motor system in accordance with one or more implementations of the technology described herein. For example, the cooling mechanism 218 may be installed in addition to external cooling system (e.g., heat sink) that may be positioned outside of the motor frame 202. In this example, the cooling mechanism 218 may include running a refrigerant or other cooling devices to the air gap on top or below the motor-shaft arm 212. In another example, the cooling mechanism lines may be inserted in the motor-shaft arms 212 and in the air gap behind the stator housing 204.

The electric motor described above may be utilized, for example, in a turbine, in a generator, in deep water pumps, and the like. For example, the turbine includes a power source that supplies energy to the electric motor system in order to generate mechanical energy. In this example, the mechanical energy is supplied by the revolution of the motor shaft 210.

Alternatively, the configuration of the motor-shaft arm 212 and the motor shaft 210 may have additional rotor and stator windings on the same motor shaft for additional torque. For example, the physical number of motor-shaft arm 212 and corresponding rotor windings 214 are increased for additional torque. In this example, the rotor windings 214 may be developed or wound to form a circle and without the sections in between its north and south windings. In this manner, the variable winding configuration in the rotor windings 214 will correspondingly vary the received torque and the revolution speed (e.g., revolution per minute (RPM)) as well.

Top-Sectional View of Example Electric Motor

Figure 3:
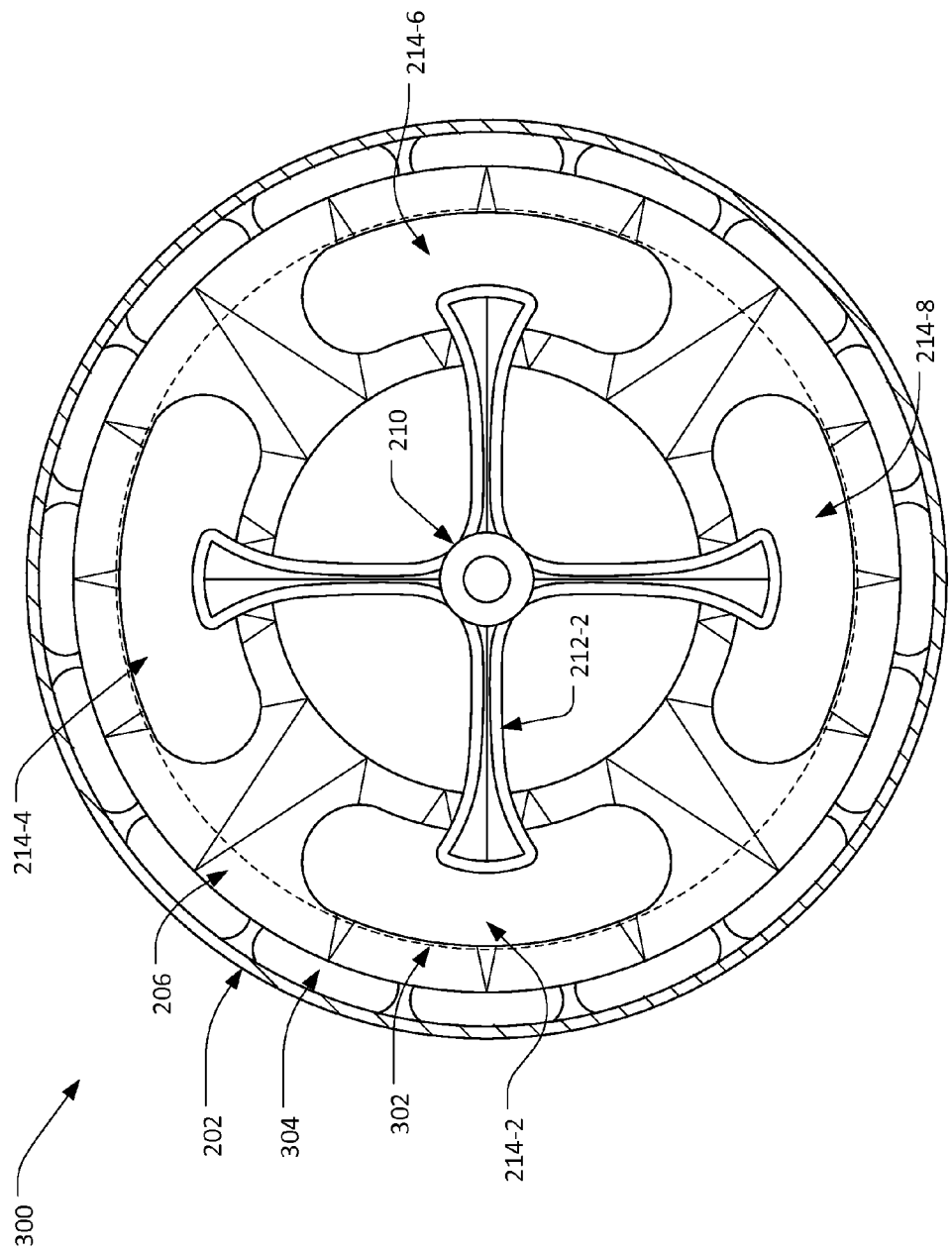
FIG. 3 illustrates an example top-sectional view of an electric motor system in accordance with one or more implementations described herein.

FIG. 3 is a top-sectional view 300 of the electric motor system in accordance with one or more implementations of the technology described herein. The top-sectional view 300 shows rotor windings 214 and corresponding motor-shaft arms 212, a circumferential path surface 302, and an air gap 304 in between the motor frame 202 and the stator windings 206.

As an example implementation herein, the four rotor windings 214 are identical and they are positioned equidistant with one another in a plane that is perpendicular to the positioned motor shaft 210. When the stator windings 206 are energized, the rotor windings 214 orbit the center of the motor shaft 210. Intuitively, an angular momentum will be created on axial axis of the motor shaft 210; however, the structure of the four rotor windings 214 and the motor-shaft arms 212 may be constructed to adapt the gyroscopic flywheel principle. With this gyroscopic configuration, reluctance pulsing of the energizing currents at operating speeds may still provide the same amount of torque in the electric motor system and thereby increases the life cycle runtime.

During operation, the orbiting rotor windings 214 defines the circumferential path surface 302 that includes an outer surfaces of a ring that is defined by the orbiting rotor windings 214. This circumferential path surface 302 is enveloped by the C-shaped stator windings 206. For example, the C-shaped stator windings 206 envelope at least seventy five percent (or three quarters) of the rotor windings 214. In this example, the interacting magnetic fields between the stator and rotor windings will further facilitate the stabilization of the angular momentum in the motor shaft 210 of the electric motor system.

With continuing reference to FIG. 3, the air gap 304 may allow ventilation of heat that is generated by the stator and rotor windings. For example, the air gap 304 will circulate the heat coming from the sections of the stator and rotor windings to the air gap on top or below the motor-shaft arms 212.

Example Isometric View of Orbiting Rotor Windings

Figure 4:
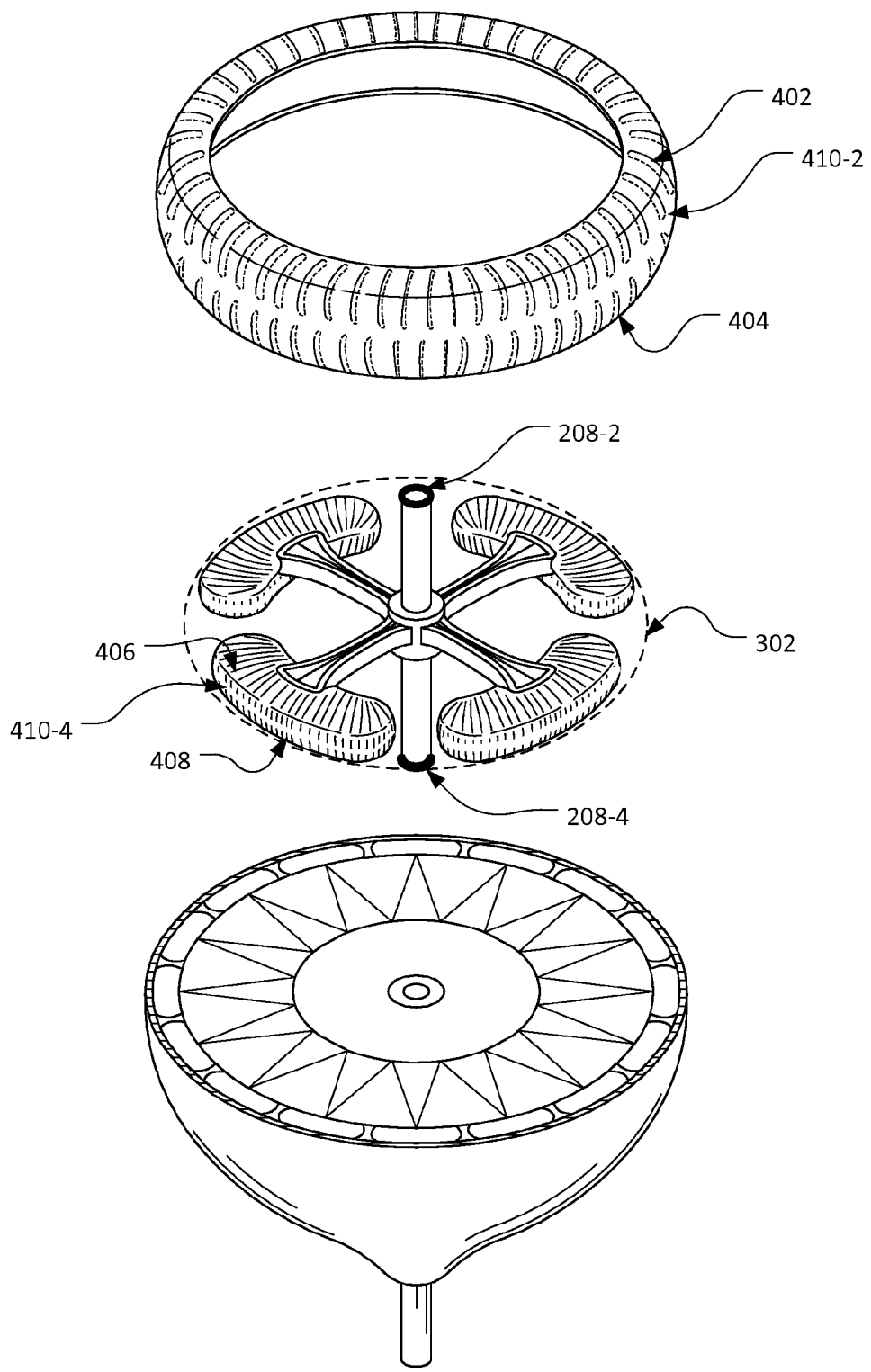
FIG. 4 illustrates an example isometric view of an orbiting rotor winding in accordance with one or more implementations described herein.

FIG. 4 illustrates an example isometric view 400 of the orbiting rotor. As shown, the isometric view 400 includes an upper hemispherical windings 402, a lower hemispherical windings 404, a north side windings 406, a south side windings 408, and sections 410.

As an example of present implementation herein, the upper hemispherical windings 402 and the lower hemispherical windings 404 define the C-shaped stator windings 206. For example, the upper hemispherical windings 402 form the upper arc while the lower hemispherical windings 404 form the lower arc of the C-shaped stator. In this example, the rotor windings 214 orbit within (i.e., inside) of this C-shaped stator windings while an opening in the mouth of the C-shaped stator windings includes a clearance that is wide enough to allow the motor-shaft arms 212 to pass through.

As an example of present implementation herein, the upper hemispherical windings 402 and the lower hemispherical windings 404 may include a circular linear winding.

With continuing reference to FIG. 4, the north side windings 406 and the south side windings 408 form the rotor windings 214. The north side windings 406 is paired with the enveloping upper hemispherical windings 404 while the south side windings 408 is paired with the enveloping lower hemispherical windings 406. In this example, the north side windings 406 and the south side windings 408 may include a semi-circular winding.

The section 410-2 is a space in between the between the upper hemispherical windings 402 and the lower hemispherical windings 404. On the other hand, the section 410-4 is the space in between the north side windings 406 and the south side windings 408. These sections 410-2 and 410-4 in the rotor and stator windings are identical and collinear. These section are, for example, utilized as a path for ventilating the heat through the air gaps as discussed in FIGS. 2 and 3.

In other implementations, the rotor windings 214 may be configured to include a full solid circular windings as opposed to equally divided north and south winding sections as shown in FIG. 4. For example, the full solid circular rotor windings will be enveloped by a full stator windings as well. In this example, the rotor windings 214 receive more amount of inducing currents that facilitate greater full load torque during operation.

As an example application of the electric motor system in FIG. 4, the motor shaft 210, the orbiting rotor windings 214 and the corresponding motor-shaft arms 212 may facilitate power to a turbine such as, for example, of a jet turbine. For example, the equally divided north and south winding sections of the rotor windings 214 will provide higher speed (e.g., revolutions per minute (RPM)) without need of gas combustions in existing jet turbines. In this example, the motor-shaft arms 212 may be configured to act as turbine vanes as well.

Example Method of Electric Motor System Manufacturing

Figure 5:
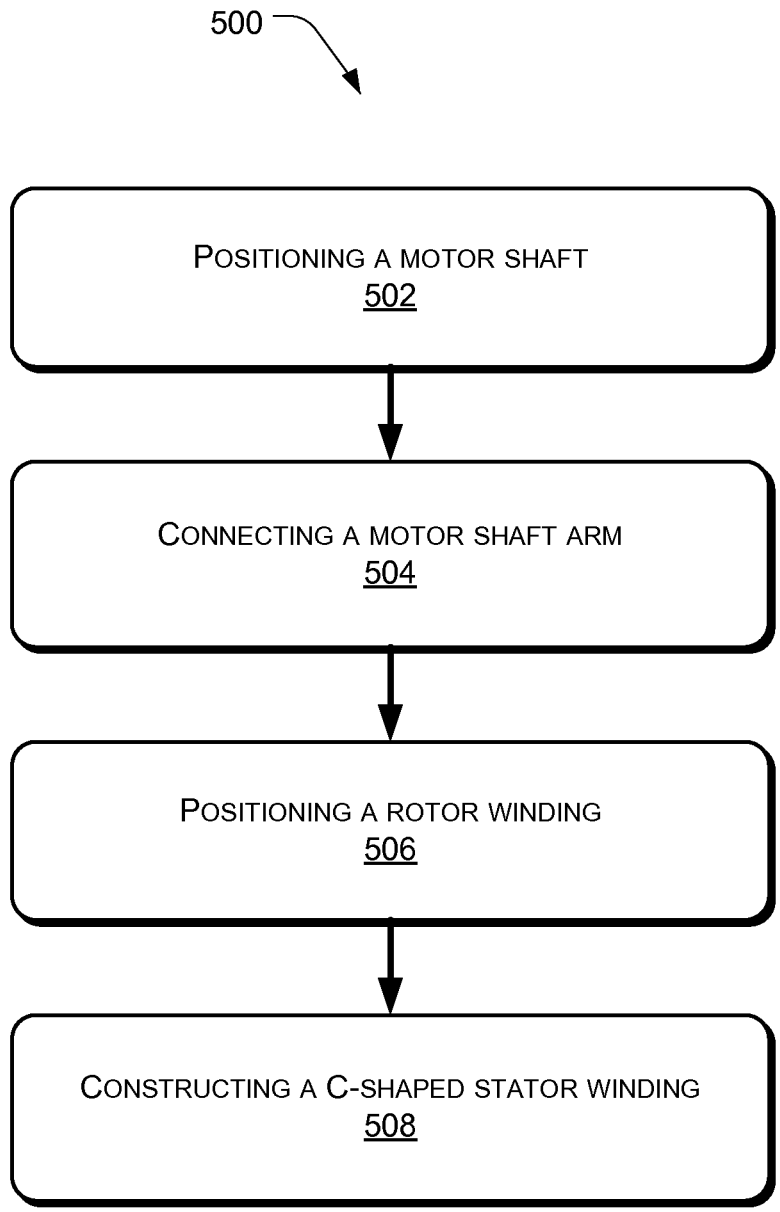
FIG. 5 is an example method for manufacturing an electric motor system in accordance with one or more implementations described herein.

FIG. 5 shows an example flowchart 500 illustrating an example method of manufacturing an electric motor system that reduces stress in motor shaft bearings and at the same time, provides adequate heat ventilation in the electric motor system.

At block 502, an electric motor system is assembled by positioning a motor shaft in a motor frame. For example, the motor shaft 210 is positioned vertically in the motor frame 202.

At block 504, the electric motor system assembly includes positioning of a motor-shaft arm to the motor shaft. For example, the motor-shaft arm 212 extends perpendicularly from a center or midpoint of the motor shaft 210.

At block 506, the electric motor system assembly is configured to include positioning of rotor windings in the motor-shaft arm. For example, the rotor windings 214 is associated with a tip of the motor-shaft arm 212. In this example, the rotor windings 214 orbit the center or midpoint of the motor shaft 210.

At block 508, the electric motor system assembly is configured to include forming a C-shaped stator windings. For example, the C-shaped stator windings 206 envelope substantially the rotor windings 214. In this example, the rotor windings 214 orbit inside the C-shaped stator windings 206 while an opening in the C-shaped stator windings 206 includes a clearance for the motor-shaft arm 212 that is attached to the rotor windings 214.

Additional and Alternative Implementation Notes

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the execution of the instructions on the medium may cause performance of the operations described herein.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The invention claimed is:

1. An electric motor system comprising:
   a motor frame;
   a motor shaft that is positioned in the motor frame;
   two or more motor-shaft arms spinning on the motor shaft, wherein each motor-shaft arm is equidistant with one another on a circular plane to form a gap space in between adjacent motor-shaft arms, wherein the gap space provides air circulation within the motor frame during spinning operations by the motor-shaft arms;
   a rotor winding that is positioned on a tip of each of the motor-shaft arms, the rotor winding is configured to receive inducing currents that facilitate the rotor winding to orbit an axis of the motor shaft;
   a stator winding that is configured to generate the inducing currents, the stator winding being configured into a circular C-shaped stator that substantially envelopes a circumferential path surface of the orbiting rotor winding, the circumferential path surface includes an outermost surface of a ring that is formed by the orbiting rotor winding.

2. An electric motor system as recited in claim 1, wherein the motor frame is configured to form a spherical shape.

3. An electric motor system as recited in claim 1, wherein the motor-shaft arm acts as a vane.

4. An electric motor system as recited in claim 1, wherein the stator winding includes an upper hemispherical winding and a lower hemispherical winding to form the C-shaped stator, the upper hemispherical winding envelopes a top side winding of the rotor winding, the lower hemispherical winding envelopes a lower side winding of the rotor winding, wherein a section in between the upper and the lower hemispherical windings is collinear with the section that is in between the top and lower side windings of the rotor winding.

5. An electric motor system as recited in claim 1, wherein the C-shaped stator envelopes at least three quarters of the rotor winding.

6. An electric motor system as recited in claim 1 further comprising a stator housing that is attached to the motor frame, wherein an air gap is allocated between the motor frame and the attached stator housing.

7. An electric motor system as recited in claim 1 further comprising an upper bearing and a lower bearing that couples the motor shaft to the motor frame, the upper bearing and the lower bearing hold a top end and a bottom end, respectively, of the vertical motor shaft.

8. An electric motor system as recited in claim 1 further comprising a cooling mechanism that is located within the motor frame, the cooling mechanism is positioned in an air gap on top or below the motor-shaft arm.

9. A turbine comprising:
a power source;
an electric motor system associated with the power source, the electric motor system comprising:
a motor frame;
a motor shaft that is positioned in the motor frame;
two or more motor-shaft arms spinning on the motor shaft, wherein each motor-shaft arm is equidistant with one another on a circular plane to form a gap space in between adjacent motor-shaft arms, wherein the gap space provides air circulation within the motor frame during spinning operations by the motor-shaft arms;
a rotor winding that is associated with a tip of each of the motor-shaft arms, the rotor winding is configured to receive inducing currents that facilitate the rotor winding to orbit an axis of the motor shaft
a stator winding that is configured to generate the inducing currents, the stator winding being configured into a circular C-shaped stator that substantially envelopes a circumferential path surface of the orbiting rotor winding, the circumferential path surface includes an outermost surface of a ring that is formed by the orbiting rotor winding.

10. A turbine as recited in claim 9, wherein a multiple motor-shaft arms act as a vane.

11. A turbine as recited in claim 9, wherein the rotor winding includes a top side winding, a lower side winding, and a space section in between the top and lower side windings for heat ventilation.

12. A turbine as recited in claim 9, wherein the C-shaped stator envelopes at least three quarters of the orbiting rotor winding.

13. A turbine as recited in claim 9, wherein the stator winding includes an upper hemispherical winding, a lower hemispherical winding, and a space section in between the upper and lower hemispherical windings for heat ventilation.

14. A turbine as recited in claim 9 further comprising a stator housing that is attached to the motor frame, wherein an air gap is allocated between the motor frame and the stator housing.

15. A turbine as recited in claim 9 further comprising an upper bearing and a lower bearing that couples the motor shaft to the motor frame, the upper bearing and the lower bearing hold a top end and a bottom end of the motor shaft, respectively.

16. A turbine as recited in claim 9 further comprising a cooling mechanism that is located within the motor frame, the cooling mechanism is positioned in an air gap on top or below the motor-shaft arm.

17. A method of manufacturing an orbital electric motor system comprising:
positioning a motor shaft in a motor frame;
connecting two or more motor-shaft arms perpendicularly from the motor shaft, wherein each motor-shaft arm is equidistant with one another on a circular plane to form a gap space in between adjacent motor-shaft arms, wherein the gap space provides air circulation within the motor frame during spinning operations by the motor-shaft arms;
positioning a rotor winding at a tip of each of the motor-shaft arms, the rotor winding is configured to receive inducing currents that facilitate the rotor winding to orbit an axis of the motor shaft;
constructing a C-shaped stator winding that is configured to generate the inducing currents, the C-shaped stator winding substantially envelopes a circumferential path surface of the orbiting rotor winding, the circumferential path surface includes an outermost surface of a ring that is formed by the orbiting rotor winding.

18. A method as recited by claim 17 further comprising:
coupling each end of the motor shaft to the motor frame with a bearing;
allocating an air gap in between the motor frame and a stator housing, the stator housing includes the constructed C-shaped stator winding.

19. A method as recited by claim 17, wherein the constructing the C-shaped stator winding includes a stator winding that envelopes at least three quarters of the orbiting rotor winding.

20. A method as recited by claim 17, wherein the constructing the C-shaped stator winding includes constructing an upper hemispherical winding and a lower hemispherical winding to form the C-shaped stator winding, the upper hemispherical winding envelopes a top side winding of the rotor winding, the lower hemispherical winding envelopes a lower side winding of the rotor winding, wherein a section in between the upper and the lower hemispherical windings is collinear with the section in between the top and lower side windings.

* * * * *